(12) United States Patent
Sunkara et al.

(10) Patent No.: US 11,183,682 B2
(45) Date of Patent: Nov. 23, 2021

(54) SPINEL LITHIUM TITANIUM OXIDE (LTO) NANOWIRE ANODE MATERIAL FOR LITHIUM ION BATTERIES

(71) Applicant: Advanced Energy Materials, LLC, Louisville, KY (US)

(72) Inventors: Mahendra Kumar Sunkara, Sunkara, KY (US); Vivekanand Kumar, Louisville, KY (US); Veerendra Atla, Louisville, KY (US)

(73) Assignee: Advanced Energy Materials, LLC, Louisville, KY (US)

( * ) Notice: Subject to any disclaimer, the term of this patent is extended or adjusted under 35 U.S.C. 154(b) by 200 days.

(21) Appl. No.: 16/554,619

(22) Filed: Aug. 29, 2019

(65) Prior Publication Data
US 2020/0075932 A1    Mar. 5, 2020

Related U.S. Application Data

(60) Provisional application No. 62/725,335, filed on Aug. 31, 2018.

(51) Int. Cl.
| | |
|---|---|
| *H01M 4/485* | (2010.01) |
| *H01M 4/131* | (2010.01) |
| *H01M 4/75* | (2006.01) |
| *H01M 4/04* | (2006.01) |
| *H01M 4/1391* | (2010.01) |
| *C01G 1/02* | (2006.01) |
| *C01G 23/00* | (2006.01) |
| *B01J 21/06* | (2006.01) |
| *C01G 23/047* | (2006.01) |

(52) U.S. Cl.
CPC .......... *H01M 4/131* (2013.01); *B01J 21/063* (2013.01); *C01G 1/02* (2013.01); *C01G 23/005* (2013.01); *C01G 23/047* (2013.01); *H01M 4/0416* (2013.01); *H01M 4/0471* (2013.01); *H01M 4/1391* (2013.01); *H01M 4/485* (2013.01); *H01M 4/75* (2013.01)

(58) Field of Classification Search
None
See application file for complete search history.

(56) References Cited

U.S. PATENT DOCUMENTS

| | | | |
|---|---|---|---|
| 6,086,844 A * | 7/2000 | Koike | B01J 21/063 423/598 |
| 8,273,480 B2 | 9/2012 | Kim et al. | |
| 9,409,141 B2 | 8/2016 | Sunkara et al. | |
| 9,882,237 B2 | 1/2018 | Lee et al. | |
| 9,929,428 B2 | 3/2018 | Yokoyama | |
| 10,192,690 B2 | 1/2019 | Huang et al. | |
| 10,256,459 B1 | 4/2019 | Zhamu et al. | |

(Continued)

*Primary Examiner* — Jeremiah R Smith
(74) *Attorney, Agent, or Firm* — Law Office of J L Simonic

(57) ABSTRACT

The present development is a process for the preparation of nanowire synthesis, coatings and uses thereof. Lithium titanate (LTO) nanowires are synthesized using a continuous hydrocarbon/plasma flame process technology combined with the dry impregnation method. The resulting LTO nanowires can be used as electro active anode materials for lithium ion batteries. The coating parameters, such as thickness, porosity of the film, packing density, and viscosity are controlled using the length of the nanowires, calendaring pressure, and slurry composition.

14 Claims, 4 Drawing Sheets

(56) References Cited

U.S. PATENT DOCUMENTS

| | | | |
|---|---|---|---|
| 10,367,236 B2 | 7/2019 | Zhu et al. | |
| 10,388,983 B2 | 8/2019 | Zhamu et al. | |
| 2009/0253039 A1* | 10/2009 | Kang | C01G 53/42 |
| | | | 429/221 |
| 2012/0070717 A1* | 3/2012 | Harada | H01M 4/625 |
| | | | 429/156 |
| 2013/0017145 A1* | 1/2013 | Sunkara | C01B 33/32 |
| | | | 423/592.1 |
| 2015/0280231 A1* | 10/2015 | Fu | H01M 4/485 |
| | | | 429/231.1 |
| 2016/0240328 A1 | 8/2016 | Huang et al. | |
| 2016/0365574 A1* | 12/2016 | Kim | C01G 23/005 |
| 2017/0346090 A1* | 11/2017 | Hanawa | H01G 11/26 |
| 2017/0373344 A1* | 12/2017 | Hadidi | C01G 45/1228 |
| 2018/0076453 A1 | 3/2018 | Durstock et al. | |
| 2019/0020014 A1 | 1/2019 | Cherng et al. | |
| 2020/0071184 A1* | 3/2020 | Jin | B01J 20/28007 |

* cited by examiner

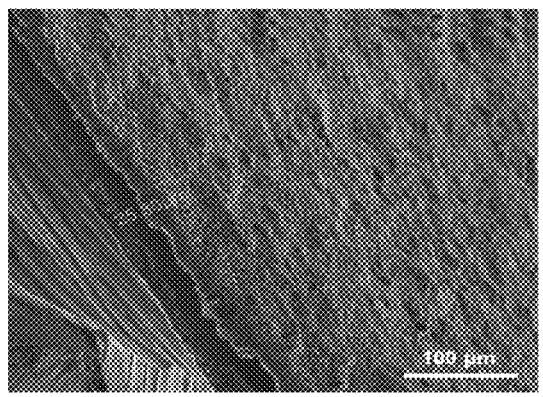 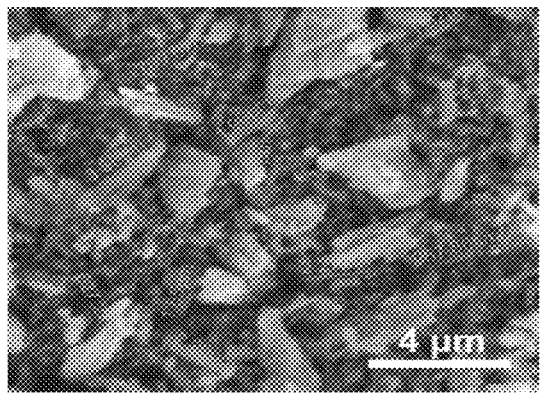
Figure 5(A)    Figure 5(B)
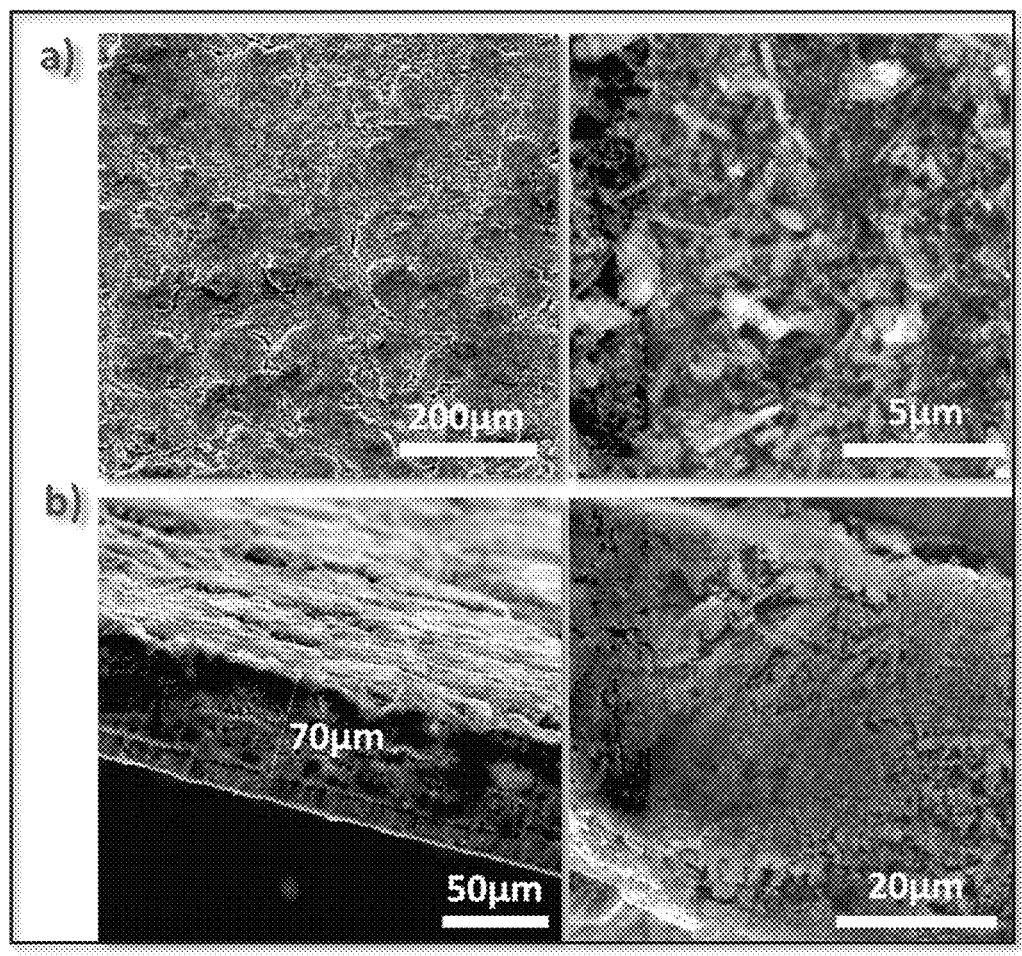
Figure 6

SPINEL LITHIUM TITANIUM OXIDE (LTO) NANOWIRE ANODE MATERIAL FOR LITHIUM ION BATTERIES

CROSS-REFERENCE TO PRIOR APPLICATIONS

The present application claims priority to U.S. 62/725,335 filed on 31 Aug. 2018 and incorporated herein in its entirety by reference.

FIELD OF THE INVENTION

The invention relates to nanowire synthesis and coatings and uses thereof.

BACKGROUND OF THE INVENTION

Lithium titanium oxide or lithium titanate (LTO) materials have been developed and commercially used in storage devices, such as lithium ion batteries, power generation industries, automobile vehicles and other power storage devices. LTO-based materials have relatively long lifetimes, high input/output characteristics, are safer than other batteries, and are zero-strain materials, which undergo less than 0.1% of volume expansion during the cycling of lithium ion intercalation and deintercalation.

Nanomaterials are attractive for lithium ion batteries due to their excellent inherent properties at the nanoscale level. It has been reported that nanomaterials have shorter path lengths for lithium ion diffusion than prior art battery materials which provides the nanomaterials higher capacities even at higher rates of charge and discharge, higher capacity retention with less than 2% loss, high active surface sites, and enhanced material characteristics due to the quantum confinement effects.

However, nanomaterials can be challenging to use in battery applications. If the nanomaterials are in the form of nanoparticles, they tend to pack tightly in a film and sinter into nearly a solid when used directly as produced. To overcome these issues, LTO mesoporous thick electrode coatings are applied. This requires the LTO nanoparticles to be microporous spherical aggregated particles (from about 10 μm to about 20 μm size) which is achieved through spheronization involving expensive spray drying processing, making this approach commercially unappealing.

An alternative approach is to use nanowires rather than nanoparticles for battery coatings. Nanowire materials naturally pack to form microporous particles and/or mesoporous coatings or films. Further, mesoporosity of nanowire coatings can be controlled by controlling the nanowire lengths, slurry composition, thickness of film, and calendaring pressure. However, production of nanowires at a commercial scale has proven to be challenging. For example, LTO nanowires have been synthesized at the research scale using a high temperature solid state reaction method, sol-gel method, hydrothermal method, self-supported growth of nanowires and post synthesis of $TiO_2$ nanowires. The main drawbacks of these methods are the long production time required, contamination from other impurities, and the small quantities of nanowires produced per unit time.

Thus, it would be beneficial to have a method for large scale production of lithium titanium oxide nanowires. It would further be beneficial to have a method for large scale production of high purity lithium titanium oxide nanowires for use in battery coatings.

SUMMARY OF THE PRESENT INVENTION

The present development is a process for the preparation of nanowires and their coatings and uses thereof. Lithium titanate (LTO) nanowires are synthesized using a continuous hydrocarbon flame or plasma source processing treatment combined with a dry impregnation method. A lithium precursor is dry impregnated onto titanate nanowires ($TiO_2$ nanowires) and the mixture is exposed to a hydrocarbon flame or plasma source followed by calcining to obtain the LTO nanowires. About a 99% conversion rate is observed, and LTO nanowires with an average diameter of from about 200 nm to about 250 nm and average length of from about 4 μm to about 6 μm size are obtained. The method is low cost and energy efficient and impurity free for the production of LTO nanowires.

The LTO nanowires can be used as electro active anode materials for lithium ion batteries. The LTO nanowires have a specific discharge capacity of from about 170 mAh/g to about 165 mAh/g with from about a 96% to about a 99% columbic efficiency, Further, the LTO nanowires retain about 88% capacity even at a current rate of about 5 C for at least 295 cycles. At 5 C, a specific discharge capacity of from about 142 mAh/g to about 143 mAh/g and coulombic efficiency close to 100% is observed. The LTO nanowires can be coated on an aluminum foil using a roll to roll process without further processing for the packing of nanomaterials.

BRIEF DESCRIPTION OF THE FIGURES

FIG. 5(A) is a scanning electron microscope image of a cross-sectional view of a 25 micron thick film coating prepared from the LTO nanowires, carbon black powder, and PVDF, wherein the coating is made according to the present invention;

FIG. 5(B) is a scanning electron microscope image of a top view of the coating of FIG. 5(A) with 2-3 micron nanowires;

FIG. 6 is a set of scanning electron microscope images of a coating prepared from the LTO nanowires, carbon black powder, and PVDF, wherein the coating has a dry film thickness of about 70 μm and has been calendared as described in Example 3, and image (a) is a top view at different magnifications with 2-3 micron long nanowires, and image (b) is a cross-sectional view at different magnifications with 70 micro thick film on aluminum foil;

DETAILED DESCRIPTION OF THE PRESENT DEVELOPMENT

Figure 1A:
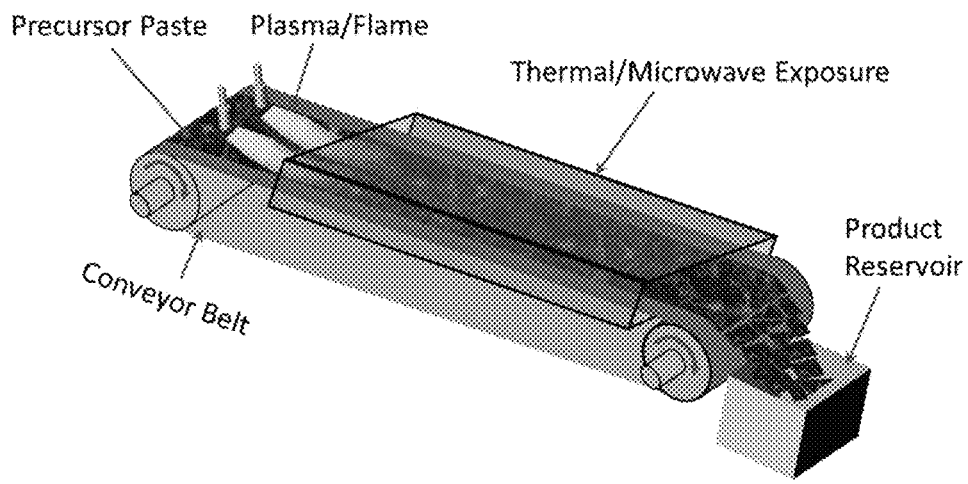
FIG. 1(A) is a schematic of the plasma and flame assisted reactor used for LTO nanowire production.

The following description is intended to provide the reader with a better understanding of the invention. The description is not intended to be limiting with respect to any element not otherwise limited within the claims. For example, the present invention will be described in the context of use with a commonly known cell battery, but the teachings herein are not limited to cell batteries.

The present invention is a continuous plasma radiation or hydrocarbon flame process combined with a dry impregnation method for the production of lithium titanium oxide ("LTO") nanowires. The process does not need or include a template for the nanowires. Specifically, the process comprises: (1) providing high quality porous $TiO_2$ nanowires; (2) mixing the $TiO_2$ nanowires with a lithium precursor, and (3) forming LTC) nanowires using a plasma or hydrocarbon flame reactor and calcination in a thermal furnace or a microwave furnace with a continuous conveyor belt system. The high quality LTO nanowires produced have a composition of $Li_4Ti_5O_{12}$ and pure cubic spinel phase.

The LTO nanowires produced can be used as electro active anode materials for lithium ion batteries by (4) blending the LTO nanowires with carbon black powder and polyvinylidene difluoride to form a slurry; (5) using the slurry prepared in Step (4) as a coating for a metal sheet; and (6) using the coated metal sheet of Step (5) as a cathode in a battery.

The $TiO_2$, nanowires may comprise any porous titanate, including but not limited to anatase phase or rutile phase $TiO_2$ nanowires. Optionally, it is recommended that the $TiO_2$ nanowires have a high surface area, for example a surface area equal to or greater than 10 $m^2$/g or more preferably equal to or greater than 30 $m^2$/g, as starting materials for preparing LTO nanowires. An exemplary process for production of high quality porous $TiO_2$ nanowires is taught in US 2018/0187094. The '094 publication teaches production of $TiO_2$ nanowires using a novel solvo-plasma approach. The $TiO_2$ nanowires produced using the solvo-plasma approach have from about a 10 nm to about a 200 nm diameter with greater than 99% conversion and produce anatase phase porous nanowires with a surface area of up to about 45 $m^2$/g. For optimum results, it is recommended that the $TiO_2$ nanowires are trimmed to a length less than or equal to about 20 μms, and preferably from about 1 μm to about 20 μms, more preferably from about 2 μms to about 10 μms, and most preferably from about 2 μms to about 3 μms, in a jet mill to obtain uniform length nanowires for the present process. Optionally, the $TiO_2$ nanowires may be jet milled to deagglomerate large chunks into individual nanowires and to narrow the $TiO_2$ nanowire length distribution. In a preferred embodiment, the resulting nanowire powders have a length distribution wherein 99% of all hydro-dynamic sizes are less than about 10 microns.

The $TiO_2$ nanowires are then wet mixed with the lithium precursor. Exemplary lithium precursors include, without limitation, lithium hydroxide, lithium hydroxide monohydrate, lithium chloride, lithium acetate, lithium carbonate, and combinations thereof. The $TiO_2$ nanowires and the lithium precursor are preferably mixed in a molar ratio of between about 0.8 and about 1.2 using a high shear mixer with the addition of a small quantity of water, generally about 5-10 wt %, to mix the material well. The mixed material is then dried at a temperature of from about 125° C. to about 140° C. for from about 2 hrs to about 6 hrs using a box drier.

When the $TiO_2$ nanowire/lithium precursor mixed material is completely dried, it is soft ground to about 20 mesh and moved to a reactor having a continuous conveyor belt system wherein the reactor comprises an in-line plasma source or hydrocarbon flame and an in-line calcination thermal furnace or microwave radiation chamber, as shown in FIG. 1(A). The mixed material is placed on a substrate on the conveyor belt, then exposed to the plasma radiation or hydrocarbon flame, and then exposed to heat or microwave radiation, and then collected. The substrate may be any substrate material known in the art, such as titanium sheets, quartz, alumina or a combination thereof. The conveyor belt speed may be adjusted to optimize the residence time, and the residence time will be dependent on the $TiO_2$ nanowire/lithium precursor mixed material treatment. For example, the conveyor belt speed is preferably set to achieve a residence time in the hydrocarbon flame of from about 15 minutes to about 4 hours, whereas the conveyor belt speed is preferably set to achieve a residence time in the plasma of from about 1 minute to about 1 hour. When a thermal furnace is used calcination, the furnace preferably has a temperature of from about 500° C. to about 800° C., and more preferably the calcination furnace has a temperature of from about 650° C. to about 750° C., and most preferably the calcination furnace has a temperature of from about 700° C. In a first preferred embodiment, the $TiO_2$ nanowire/lithium precursor mixed material is exposed to a hydrocarbon flame followed by thermal calcination, and the residence time is about 3 hours and the furnace temperature is about 700° C. The product is collected at the discharge end of the belt furnace. In a second preferred embodiment, the $TiO_2$ nanowire/lithium precursor mixed material is exposed to a plasma flame followed by microwave calcination, and the residence time is about 15 minutes with the microwave radiation frequency at 30 GHz. The LTO nanowires produced according to the present method have a well-dispersed nanostructure, a pure crystalline single phase, an average length of from about 2 μm to about 20 μm, and more preferably from about 2 μm to about 10 μm, and most preferably from about 4 μm to about 6 μm, and an average diameter of from about 75 nm to about 300 nm, and more preferably from about 150 nm to about 250 nm, and most preferably from about 200 nm to about 250 nm.

Process parameters which affect the quality of the LTO materials produced are: (1) Li/Ti molar ratio, (2) exposure temperature, (3) residence time, (4) hydrocarbon flame angle, and (5) film thickness on the substrate. A higher molar ratio of Li/Ti, for example, a molar ratio greater than 1.2, results in formation of $Li_2TiO_3$ phase materials and other compounds of lithium titanium oxide, whereas a lower Li/Ti molar ratio leaves unreacted $TiO_2$. Thus, a Li/Ti molar ratio of from about 0.8 to about 1.2 results in pure phase LTO nanowires. Exposure temperatures greater than about 800° C. result in sintering of the product whereas temperatures less than about 500° C. result in the formation of phases of lithium titanate oxide with low crystallinity of the product. Thus, it is desirable to limit production temperature to from about 500° C. to about 800° C., and more preferably to about 700° C. Residence time refers to the total time the $TiO_2$ nanowires lithium precursor mixture is exposed to the plasma source or the hydrocarbon flame. When the plasma source is microwave plasma, a very short exposure time is needed for reaction. For example, a microwave plasma source normally requires less than about one minute exposure time whereas the residence time in the hydrocarbon flame may be from about 10 minutes to about 20 minutes. Hydrocarbon flame angle has been surprisingly found to affect flame source efficiency. For optimum production rates, the angle of the flames to which the $TiO_2$ nanowire/lithium precursor mixture is exposed should be between about 30 deg and about 60 deg. In an exemplary embodiment, the $TiO_2$ nanowire/lithium precursor mixture is exposed to the hydrocarbon flame using a flame line burner having from about a 10 slpm to about a 40 slpm propane flow along with about a 1 lpm to about a 10 lpm oxygen flow is employed to generate a hydrocarbon flame jet having length of about one foot pointed downwards at a 30 deg to a 60 deg angle. The film thickness on the substrate must be controlled to ensure that all the $TiO_2$ nanowire/lithium precursor mixture is exposed to the plasma source and to the flames. It is recommended that film that the thickness on the substrate be less than about one inch, and more preferably that the thickness be from about 0.5 inches to about one inch.

Figure 1B:
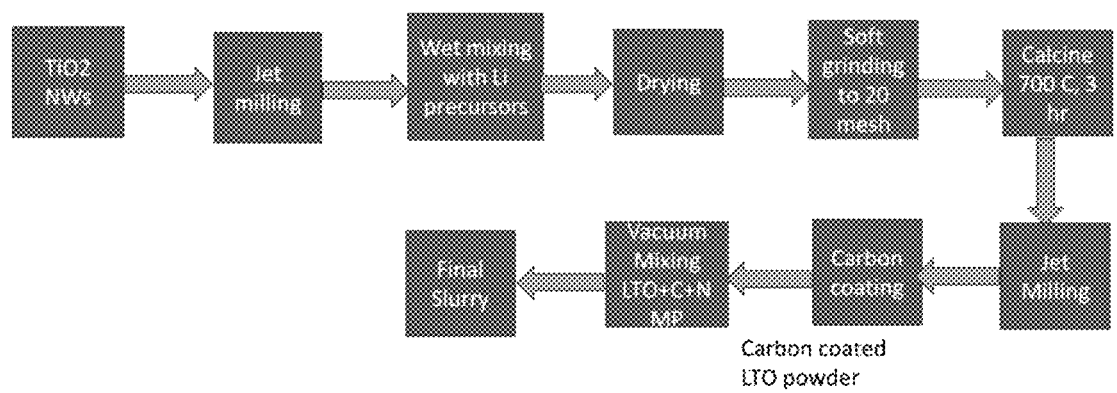
FIG. 1(B) is a schematic of the process starting with titanate nanowires through production of electro-active slurry using the jet-mill process.

The LTO nanowires made according to the present process can be used as electro-active anode materials for lithium ion batteries. To be used as electro-active anode materials, the LTO nanowires must be combined with coating materials that will not negatively affect the functionality of the LTO nanowires, but will allow the LTO nanowires to be applied as a thin layer on metal surfaces, such as on an aluminum foil surface. A preferred coating combination is prepared from LTO nanowires, a carbon source, and polyvinylidene difluoride (PVDF). Exemplary carbon sources include carbon black powder, fine sugar powder, solid hydrocarbons, liquid hydrocarbons, hydrocarbon vapors, or a combination thereof. Initially, the carbon source is used to produce a carbon coating on the LTO nanowires. Preferably, the carbon source creates a uniform and conformal coating around the LTO nanowire comprising less than about 1 wt %. As is known in the art, conformal coatings are effective for avoiding moisture uptake, reducing viscosity during slurry formation, and improves the electronic conductivity of powders. In a first embodiment, the LTO nanowires are initially combined with the carbon black powder by ball-milling the LTO nanowires for from about 15 minutes to about 20 minutes and then sieving the LTO nanowires using a 120 mesh-in-a-sieve shaker. A slurry is then prepared by dry mixing the ball-milled and sieved LTO nanowires and carbon black powders in a high shear mixer for from about 10 minutes to about 15 minutes. In a first alternative embodiment, as shown in FIG. 1(B), the LTO nanowires are jet-milled and then coated with a carbon source, such as a fine sugar powder, in a horizontal vacuum furnace. In a preferred embodiment, the jet mill uses a high-speed jet of compressed air at about 80 psi to remove large chunks from the powder mixture, and the LTO nanowires mixed with the sugar powder are subjected to inert calcination causing the sugar to oxidize and leave a thin carbon coating on the LTO nanowires. The carbon coated LTO nanowires are then combined with the PVDF. The PVDF is prepared as a separate solution using N-methyl-2-pyrrolidone (NMP) solvent held at a temperature of about 50° C. with continuous stirring using a magnetic stirrer in a vacuum slurry mixer. The PVDF solution is then added to the LTO nanowire—carbon black powder mixture using a vacuum slurry mixer, wherein the vacuum is used to remove bubbles that form during the addition of solvent. NMP is added as needed to maintain the viscosity of the slurry at from about 4,000 cp to about 6,000 cp.

The slurry is then applied as a thin layer on a metal surface. In a preferred embodiment, the slurry comprises from about 30% to about 45% solids with a composition of from about 88 wt % to about 95 wt % LTO nanowires, from about 3 wt % to about 7 wt % carbon black powder, and from about 2 wt % to about 5 wt % PVDF. In an exemplary embodiment, the slurry comprises from about 30% to about 45% solids with a composition of about 91 wt % LTO nanowires, about 5 wt % carbon black powder, and about 4 wt % PVDF. Preferably, the slurry is applied as a wet-coated film having a thickness of from about 50 μm to about 75 μm with an electrode density of from about 2 $g/cm^3$ to about 3 $g/cm^3$. The wet-coated film is then dried in a vacuum furnace held at from about 120° C. to about 150° C. for from about 2 hours to about 4 hours. The porosity of the film should be between about 30% to about 50%. Most preferably, the slurry comprises 2-3 μm long nanowires on aluminum foil, as shown in FIG. 5. The slurry is applied to the aluminum foil using roll to roll process without further processing for the packing of nanornaterials.

The coated metal sheet can be used as an anode in a battery. When used as a coating, the LTO nanowires have a specific discharge capacity of from about 170 mAh/g to about 165 mAh/g at about a 0.1 C rate with from about a 96% to about a 99% columbic efficiency. Further, the LTO nanowires retain about 88% capacity even at a current rate of about 5 C for at least 295 cycles. At 5 C, a specific discharge capacity of from about 142 mAh/g to about 143 mAh/g and coulombic efficiency close to 100% is observed.

The following examples are presented solely to provide the reader with a better understanding of the process for the preparation of the LTO nanowires, the coating slurry, and the electrodes using LTO nanowires, and are not intended to be limiting with respect to any materials or specific conditions stated therein.

Example 1—Preparation of LTD Nanowires: $TiO_2$ nanowires with an anatase phase are synthesized according to the procedure set forth in US 2018/0187094. Lithium hydroxide, ground to 100 mesh size using a mortar and pestle, is mixed with a small quantity of water to form a LiOH slurry. The LiOH slurry is then mixed with the $TiO_2$ nanowires in a 0.85 to 1 molar ratio of lithium to titanium to form a $TiO_2$ nanowire/lithium precursor mixture. The $TiO_2$ nanowire/lithium precursor mixture is then transferred to a box furnace and dried at about 125° C. for about 3 hours. The dried mixture is deposited on a titanium sheet substrate so the dried mixture has a thickness of from about 0.5 inches to about 1 inch. The substrate is placed on a continuous conveyor belt and moved into the reactor where the dried mixture is exposed to a microwave plasma source for about one minute, and then is exposed to a propane flame source heated to about 700° C. with a flame line burner having about a 25 slpm propane flow along with about a 5 lpm oxygen flow and about a one foot hydrocarbon flame jet length directed at the dried material at an angle of about 45 deg. After about 3 hours exposure to the 700° C. flame reactor, the LTO nanowires are collected.

Figure 2A:
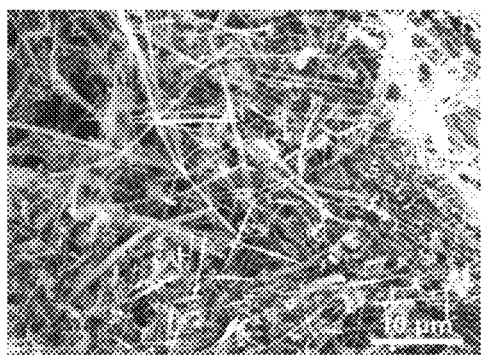
FIG. 2(A) is a scanning electron microscope image of LTO nanowires synthesized according to the present invention.
Figure 2B:
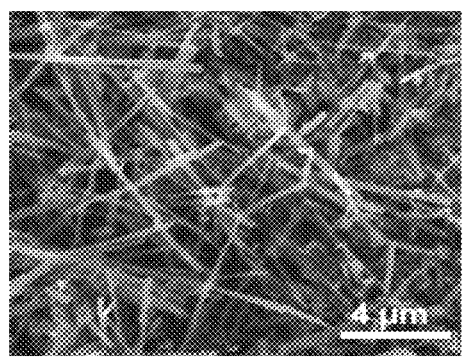
FIG. 2(B) is a scanning electron microscope image of the LTO nanowires of FIG. 2(A) a higher magnification.
Figure 3:
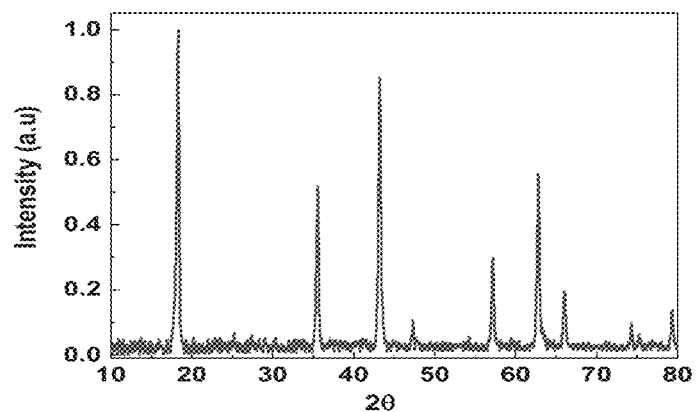
FIG. 3 is an X-ray diffraction characterization of LTO nanowires synthesized according to the present invention showing the $Li_4Ti_5O_{12}$ spinel phase (Pdf-049-0207)
Figure 4A:
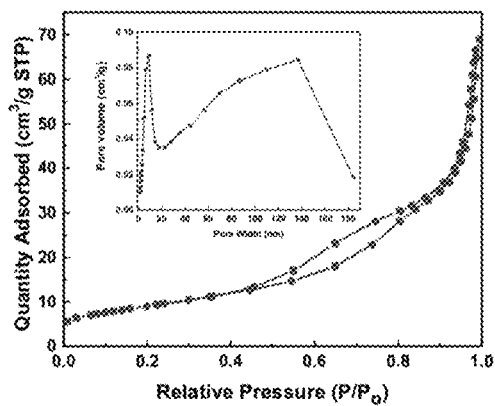
FIG. 4(A) is a graph showing the BET surface area of the $TiO_2$ nanowires.
Figure 4B:
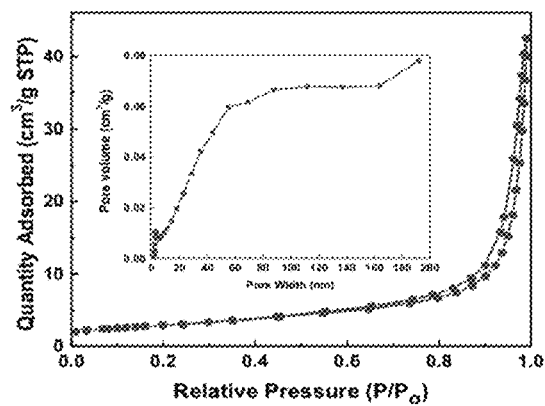
FIG. 4(B) is a graph showing the BET surface area of the LTO nanowires.

The collected LTO nanowires are characterized for morphology, elemental composition and structural properties using SEM, EDAX, XRD, and BET. As shown in FIG. 2, the LTO nanowires produced according to the present method have a well-dispersed nanostructure, a pure crystalline single phase, an average length of from about 2 μm to about 20 μm, and an average diameter of from about 75 nm to about 300 nm. An LTO nanowire XRD diffraction pattern is shown in FIG. 3. All the diffraction peaks shown have good match with $Li_4Ti_5O_{12}$ having a pure cubic spinel phase, space group Fd3m (Pdf-00-049-0207). No other phases were observed in XRD pattern. FIGS. 4A and 4B show the Brunauer—Emmett—Teller (BET) analysis of the $TiO_2$ nanowires and the LTO nanowires, respectively. A BET specific surface area of 32.28 $m^2/g$ was obtained for the $TiO_2$ nanowires, and 10.21 $m^2/g$ was obtained for LTO nanowires. The nitrogen adsorption and desorption isotherm of the $TiO_2$ nanowires and the LTO nanowires with typical hysteresis curve are shown in the FIGS. 4A and 4B, respectively.

Example 2A—Preparation of a Coating Slurry: A slurry for a coating is prepared from LTO nanowires, carbon black powder and PVDF. The LTO nanowires from Example 1 are ball-milled for about 15 minutes and then are sieved using a 120 mesh-in-a-sieve shaker. Then in a high shear mixer, about 910 g LTO nanowires is dry mixed with about 50 g carbon black powder. In a separate vessel, 40 g PVDF is mixed with 1000 g NMP solvent while holding the temperature at about 50° C. and with continuous stirring using a magnetic stirrer in a vacuum slurry mixer. The PVDF solution is then added to the pre-mixed LTO—carbon mixture in a vacuum slurry mixer. NMP is added as needed to maintain the viscosity between about 4,000 cp and about 6,000 cp, and to keep the solids content in the slurry at about 34%. The slurry is ready for use when the LTO nanowire—carbon black powder mix is thoroughly blended in the PVDF solution.

Example 2B—Preparation of a Coating Slurry: A slurry for a coating is prepared from LTO nanowires, sugar and PVDF. The LTO nanowires from Example 1 are jet-milled with compressed air at about 80 psi. About 910 g LTO nanowires are then mixed with about 5 wt % sugar and the nanowire—sugar mixture is spread on aluminum boats. The boats are loaded on a metal frame and inserted into a horizontal tube furnace having an inner diameter of about 4 inches and length of about 48 inches. The furnace is purged three times with nitrogen to remove any oxygen present. The furnace is held at about 600° C. for about 2 hours under vacuum (1-10 m Torr). The boats are then cooled in the furnace and then removed from the furnace after cooling. TGA indicates that about 1.3 wt % carbon is coated on the LTO nanowires. In a separate vessel, 40 g PVDF is mixed with 1000 g NMP solvent while holding the temperature at about 50° C. and with continuous stirring using a magnetic stirrer in a vacuum slurry mixer. The PVDF solution is then added to the pre-mixed LTO—carbon mixture in a vacuum slurry mixer. NMP is added as needed to maintain the viscosity between about 4,000 cp and about 6,000 cp, and to keep the solids content in the slurry at about 34%. The slurry is ready for use when the LTO nanowire—carbon black powder mix is thoroughly blended in the PVDF solution.

Example 3—Preparation of Electrodes using LTO Nanowires: Electrodes, specifically cathodes, are prepared using LTO nanowires, carbon black powder and PVDF binder in a weight ratio of 80:12:8. A slurry is prepared as described in Example 2, but adjusting the weights to deliver the 80:12:8 composition. The slurry is spread onto an aluminum foil to deliver about a 6 mil or 152 μm thick wet film and placed in a vacuum oven held at 120° C. for about 2 hrs. When dry, the film thickness is about 70 μm. The dry film is then calendared using an electric roller press to obtain a uniform film profile. An example of a calendared film is shown in FIG. 6. The final cathode electrode density is around 2 $g/cm^3$. Coin-type half cells of 2032 size are prepared in an argon-filled glove box. The half-cells comprise the LTO nanowire cathode, a Li metal anode, a separator and an electrolyte solution of 1M $LiPF_6$ in ethylene carbonate/dimethyl carbonate with an EC:DMC ratio of 1:2 vol %.

Figure 7:
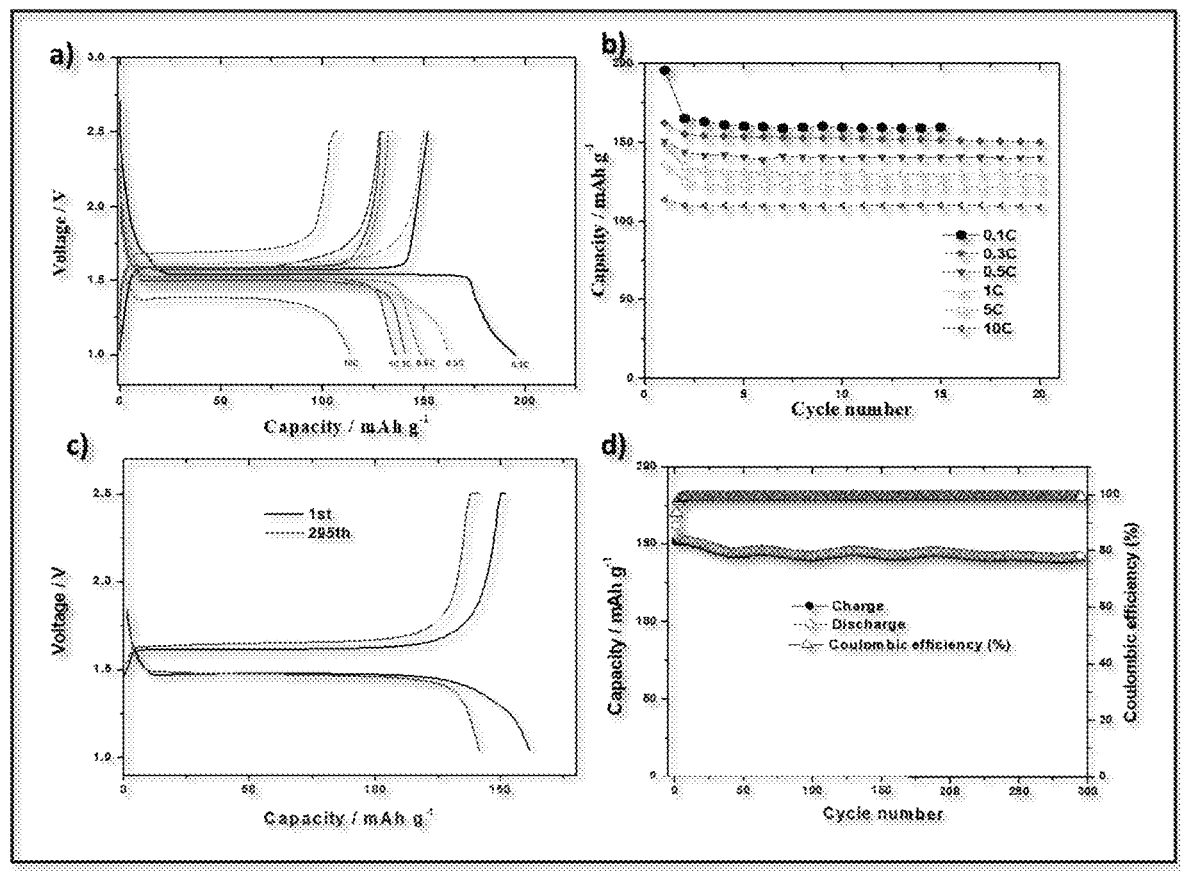
FIG. 7 is a set of graphs showing the battery performance of (a) charge-discharge curves at different C-rates from 0.1 to 10 C, (b) cyclability curves at different C rates from 0.1 to 10 C, (c) charge-discharge curve at 5 C showing the $1^{st}$ and 295$^{th}$ cycle, and (d) charge-discharge capacity and coulombic efficiency with cycles at 5 C.
Figure 8:
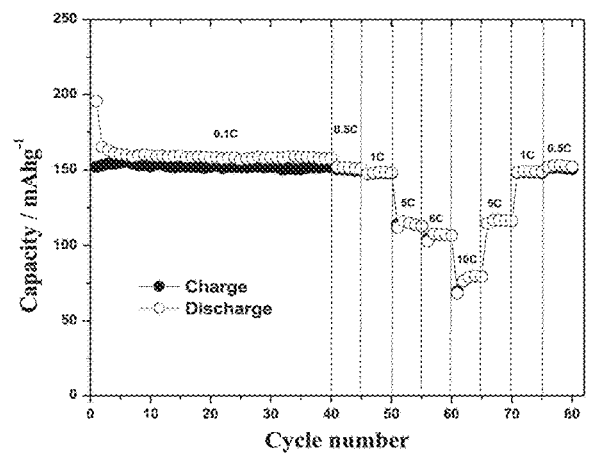
FIG. 8 a graph showing the C-rate test of the LTO electrode at different current densities, wherein 1 C=170 mA/g.

Example 4—Performance of the LTO Nanowire Coated Electrodes: Galvanostatic charge-discharge measurements were carried out using an Arbin instrument. Charge and discharge measurement were carried out at a voltage range of from about 2.5 V to about 1.0 V with different currents of 17, 51, 170, 510, and 1700 mA/g. The cyclic voltammetry measurement was carried out at the voltage range of from about 2.5 V to about 1.0 V with a scan speed of 1 mV/s using an eDAQ e-corder potentiostat. FIG. 7 shows the battery performance for the LTO nanowires. FIG. 8 shows the C-rate test of the LTO electrode at different current densities, wherein 1 C=170 mA/g.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application. All compositional percentages used herein are presented on a "by weight" basis, unless designated otherwise.

It is understood that one skilled in the art may make alterations to the embodiments shown and described herein without departing from the scope of the invention. For example, it is anticipated that the hydrocarbon flame may be used in combination with the plasma, and that the thermal furnace may be used in combination with microwave radiation, and that the $TiO_2$ nanowire/lithium precursor mixed material may be exposed to the hydrocarbon flame or to the plasma or to a combination thereof and then the $TiO_2$ nanowire/lithium precursor mixed material may be exposed to the thermal furnace or to microwave radiation or to a combination thereof.

What is claimed is:

1. A process for the production of lithium titanium oxide nanowires, or LTO nanowires, comprising: (a) providing porous $TiO_2$ nanowires; (b) mixing the $TiO_2$ nanowires with a lithium precursor, and (c) forming LTO nanowires by exposing the $TiO_2$ nanowires—lithium precursor mixture to plasma radiation or a hydrocarbon flame followed by thermal calcination or microwave calcination using a continuous conveyor belt system, and wherein the LTO nanowires are produced without using a template.

2. The process of claim 1 wherein the LTO nanowires have a composition of $Li_4Ti_5O_{12}$ and pure cubic spinal phase.

3. The process of claim 1 wherein the $TiO_2$ nanowires have a diameter from 10 nm to 200 nm and wherein the $TiO_2$ nanowires have a surface area of up to 45 $m^2/g$.

4. The process of claim 1 wherein the $TiO_2$ nanowires have a length less than or equal to 20 μms.

5. The process of claim 1 wherein the lithium precursor is selected from the group consisting of lithium hydroxide, lithium chloride, lithium acetate, lithium carbonate, and combinations thereof.

6. The process of claim 1 wherein the $TiO_2$ nanowires and the lithium precursor are mixed in a molar ratio of Li/Ti between 0.8 and 1.2.

7. The process of claim 1 wherein the $TiO_2$ nanowires are wet mixed with the lithium precursor and then the $TiO_2$ nanowire/lithium precursor mixed material is dried and then the dried $TiO_2$ nanowire/lithium precursor mixed material is soft ground to about 20 mesh.

8. The process of claim 1 wherein the LTO nanowires are formed by placing the $TiO_2$, nanowire/lithium precursor mixed material on a substrate on the conveyor belt, wherein the conveyor belt is continuously cycling through the reactor, and the $TiO_2$ nanowire/lithium precursor mixed material is exposed to a plasma source, wherein the plasma source is microwave plasma, and the $TiO_2$ nanowire/lithium precursor mixed material is then calcined with microwave radiation to produce the LTO nanowires.

9. The process of claim 1 wherein the LTO nanowires are formed by placing the $TiO_2$, nanowire/lithium precursor mixed material on a substrate on the conveyor belt, wherein the conveyor belt is continuously cycling through the reactor, and the $TiO_2$, nanowire/lithium precursor mixed material is then exposed to a hydrocarbon flame, and the $TiO_2$ nanowire i lithium precursor mixed material is then calcined in a calcination furnace to produce the LTO nanowires.

10. The process of claim 9 wherein the conveyor belt speed is set to achieve a residence time in the flame of from 15 minutes to 4 hours.

11. The process of claim 9 wherein the calcination furnace has a temperature of from 500° C. to 800° C.

12. The process of claim 9 wherein the flame source is a hydrocarbon flame and the angle of the flame to which the $TiO_2$ nanowire lithium precursor mixture is exposed is between 30 deg and 60 deg.

13. The process of claim 12 wherein the hydrocarbon flame has a length of about one foot and is pointed downward.

14. The process of claim 9 wherein the $TiO_2$ nanowire/lithium precursor mixed material on a substrate has a thickness of less than one inch.

* * * * *